United States Patent Office 2,992,558
Patented July 18, 1961

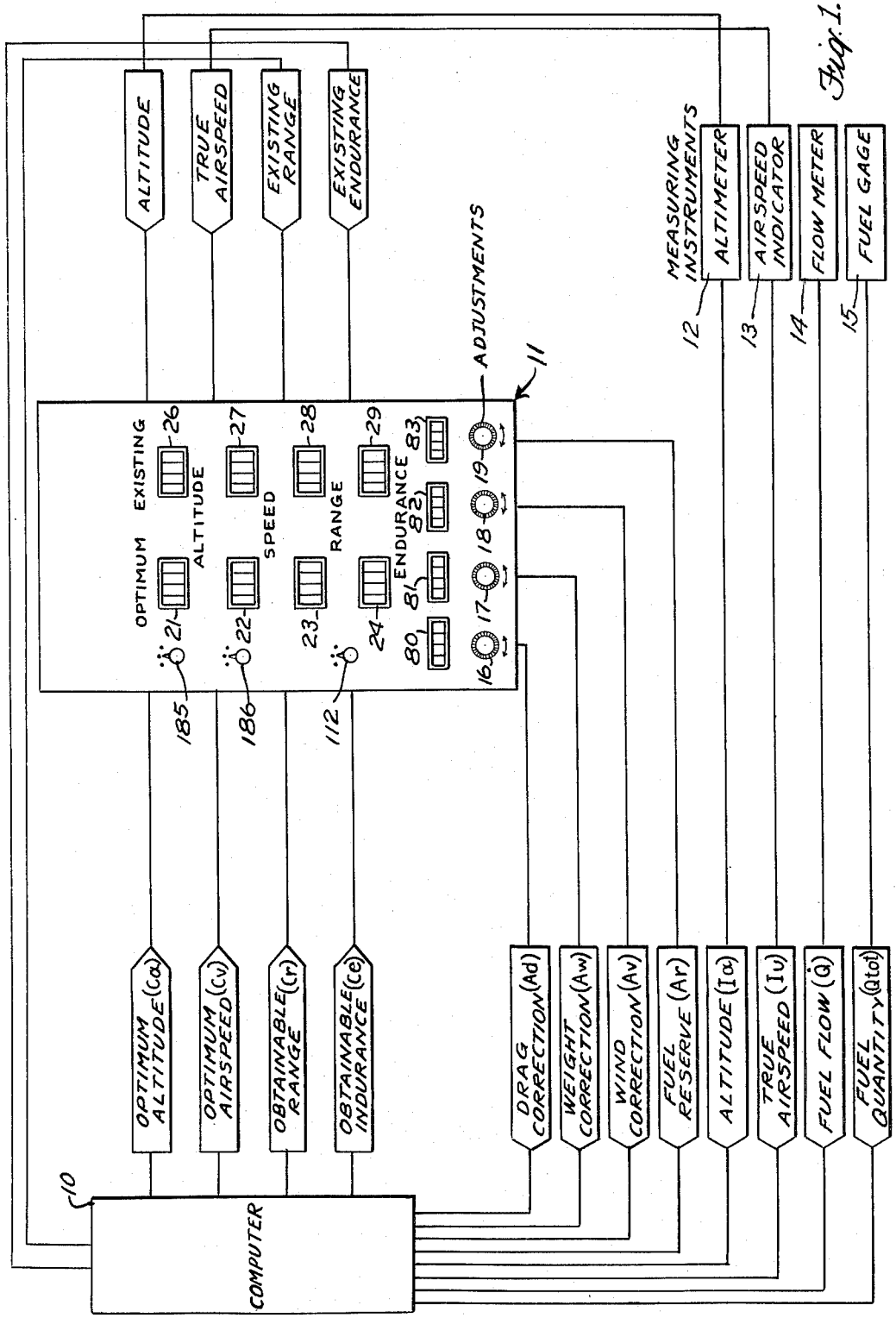

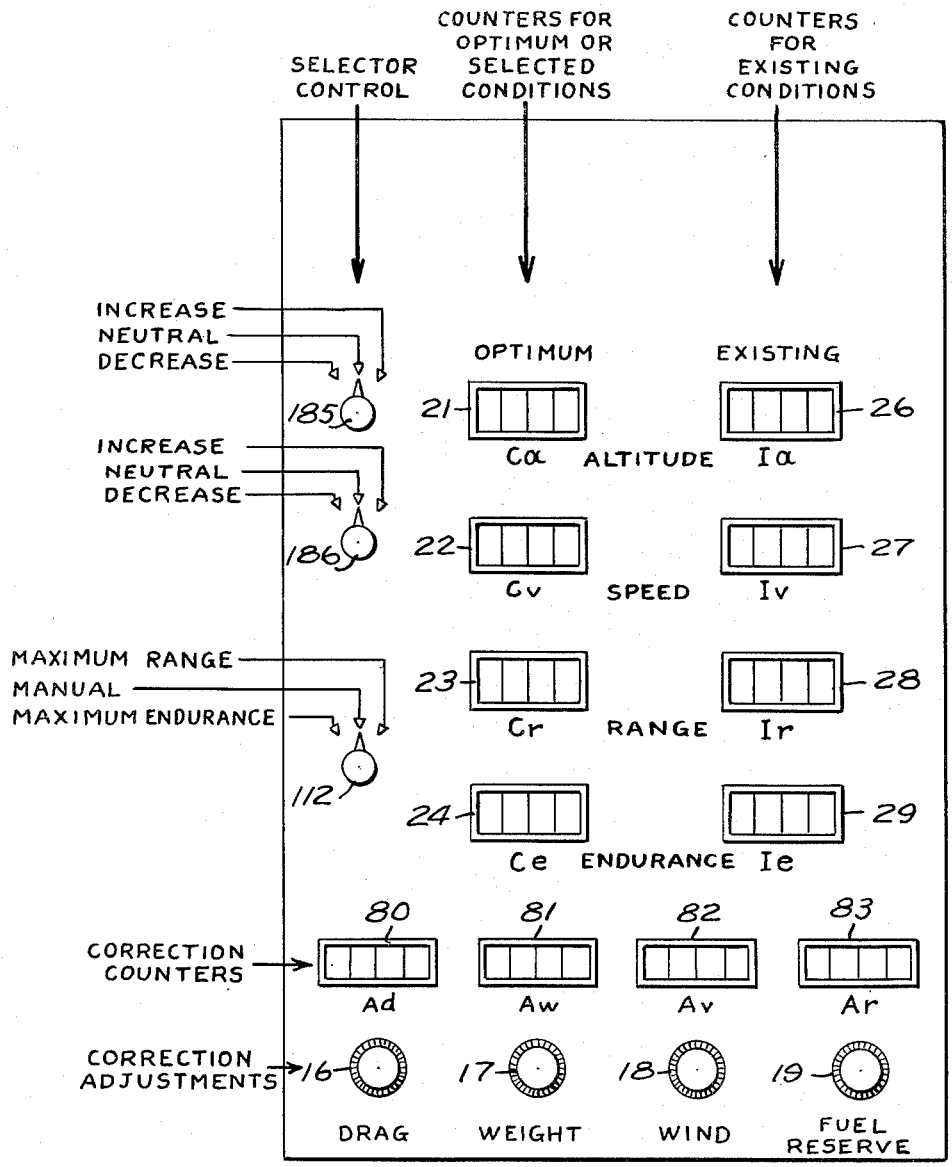

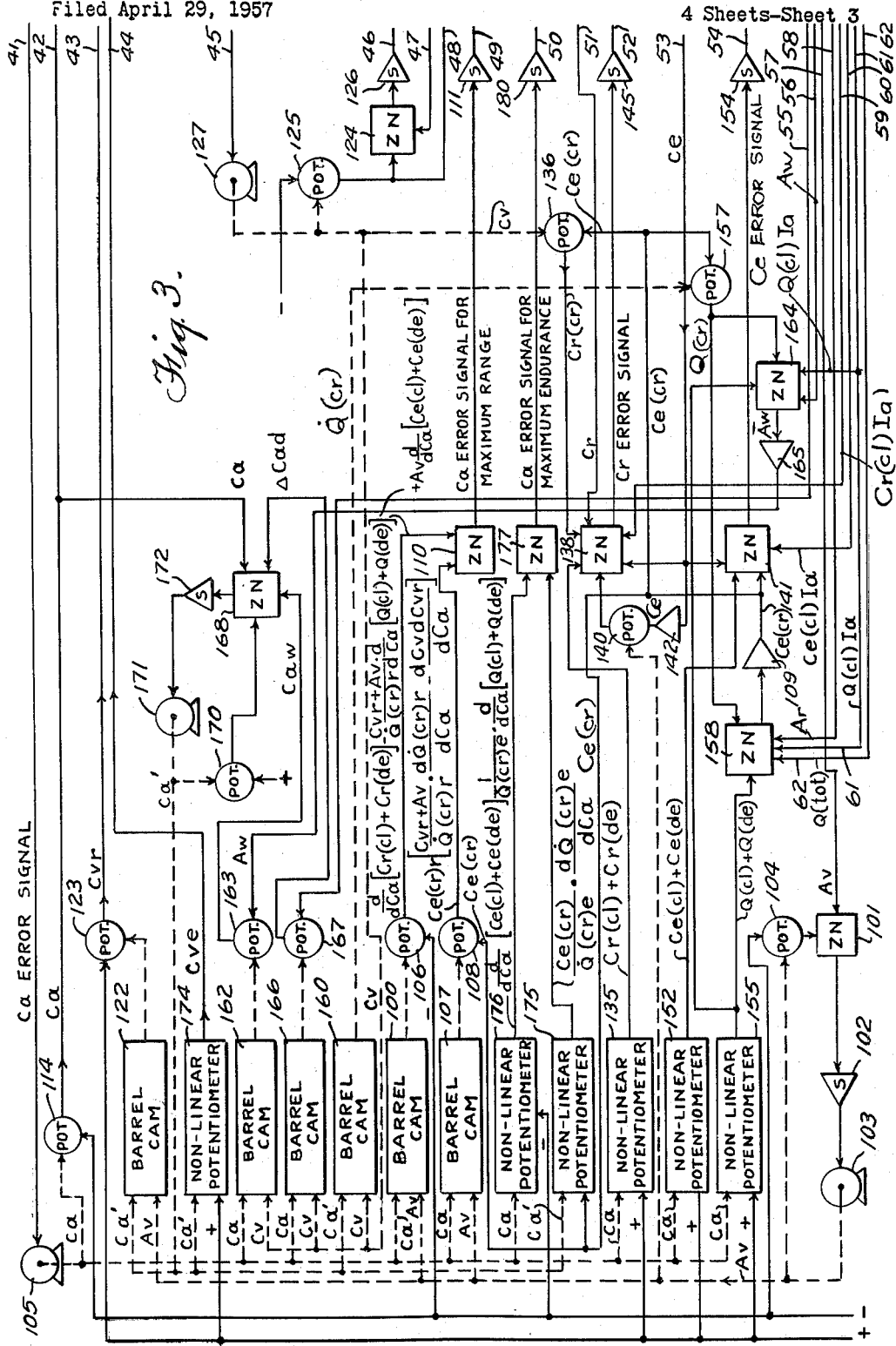

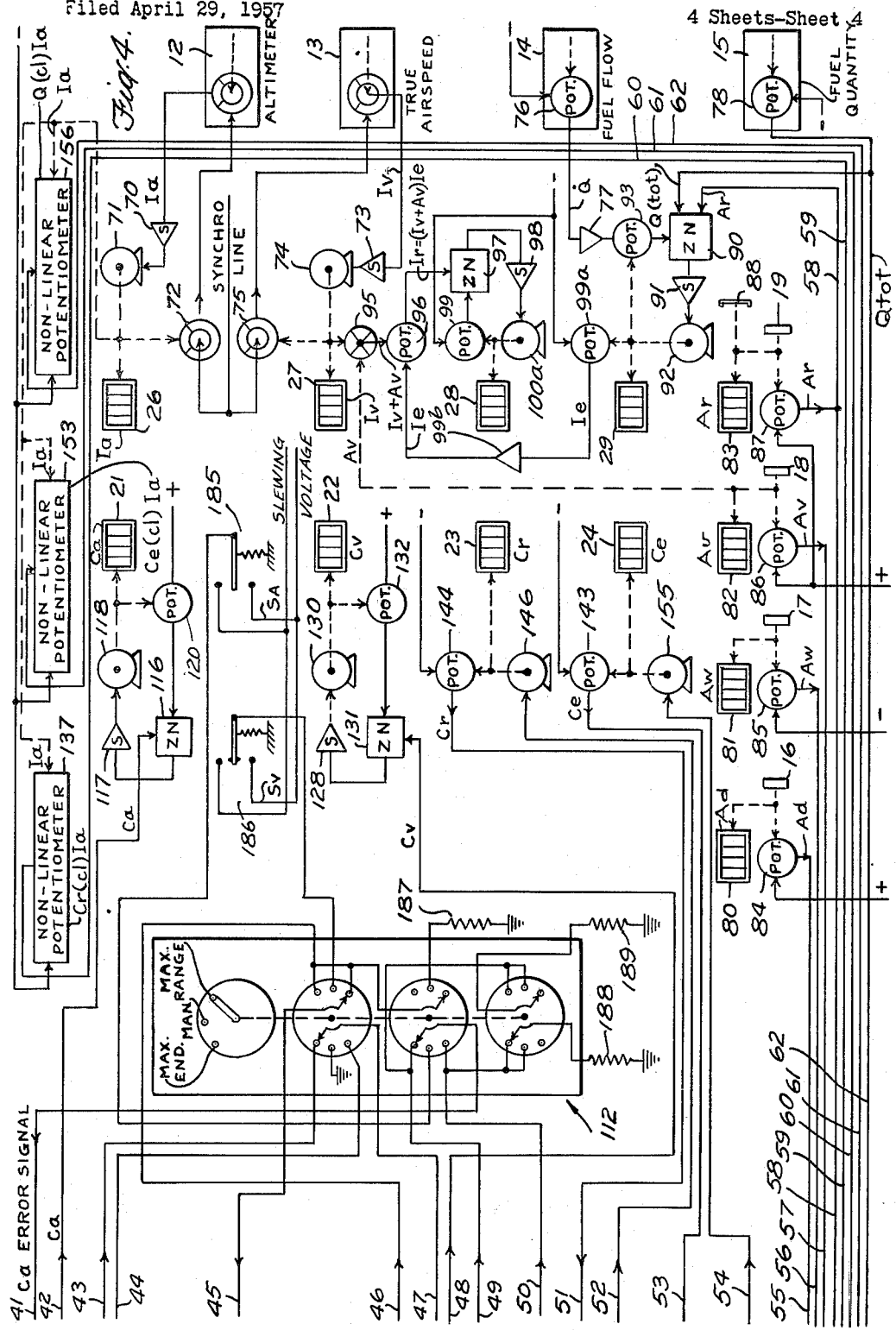

2,992,558
FLIGHT RANGE AND ENDURANCE DATA INDICATOR
William H. Newell, Mount Vernon, and Edward G. Burgess, Jr., Kew Gardens, N.Y., assignors to The Sperry Rand Corporation, Ford Instrument Company Division, Long Island City, N.Y., a corporation of Delaware
Filed Apr. 29, 1957, Ser. No. 656,476
32 Claims. (Cl. 73—178)

The present invention relates to a flight, range and endurance data indicator for an aircraft.

In the operation of a jet fighter aircraft, a wide variation in range and endurance may be experienced depending upon two controllable factors, namely airspeed and altitude. A pilot can easily destroy his range and endurance by an injudicious choice of altitude or air speed. The fighter pilot should not be diverted from his primary mission by a multiplicity of details and consequently, should be relieved of the burden of manually or mentally resolving and computing range and endurance problems while in flight.

One object of the present invention is to provide an airborne flight range and endurance data indicator, (1) which automatically and continuously provides the following information to the pilot:

(a) Range, endurance, altitude and true airspeed at the existing flight condition,
(b) Optimum altitude, optimum airspeed, obtainable range, and obtainable endurance selectively for either maximum endurance or maximum range, on a selected course with winds known, (2) which with proper control settings, can provide in-flight solution of the following:

(c) Optimum altitude, optimum airspeed, time in flight, and fuel reserve at destination for any selected course and distance, with minimum fuel consumption,
(d) Time in flight and fuel reserve at destination for any selected course and distance and for any selected altitude and/or airspeed, with winds known,
(e) Range and endurance for a selected fuel reserve, and (3) which in response to preset data or adjustments, automatically makes corrections for the following:

(f) Non-standard weight and drag, so that aircraft performance data reproduced in the indicator can be adjusted to agree with the actual performance of individual aircraft according to loading, external stores, etc.
(g) Effect of known winds on the optimum altitude and airspeed for maximum range or maximum endurance,
(h) Different values of fuel reserve selected in accordance with the type of operational mission involved, such as training, ferrying, combat, etc.
(i) Effect of fuel consumed during flight.

Various other objects of the invention are apparent from the following description and from the accompanying drawings, in which FIG. 1 illustrates data flow among the three functional divisions of the flight, range and endurance indicator embodying the present invention, namely the computer, the control and indicator panel and the measuring instruments;
FIG. 2 is a view of the control and indicator panel;
FIG. 3 shows diagrammatically a mechanism forming part of the indicator of the present invention and mainly the computer part, the flow lines with numbers on the right hand side of said figure being intended to be joined to the flow lines with corresponding numbers on the left hand side of FIG. 4, to complete illustration of the indicator; and FIG. 4 shows diagrammatically a mechanism forming the other part of the indicator of the present invention and mainly the control and indicator panel and the measuring devices.

The flight, range and endurance indicator of the present invention is based on known representative performance characteristics of the aircraft reproduced or built into the indicator and based on a programmed ascent from sea level to optimum altitude and a programmed descent from the optimum altitude to the sea level determined for best range and endurance conditions. Such representative performance data may be represented, for example, by (1) true airspeed vs. fuel flow representative performance curves for the aircraft at different altitudes for different weights and for maximum endurance and for maximum range, (2) representative performance curves showing effect of wind on optimum airspeed for maximum range at any one altitude, (3) endurance vs. altitude performance curve of the aircraft in climb and descent, (4) range vs. altitude performance curve of the aircraft in climb and descent and (5) fuel consumed vs. altitude performance curve of the aircraft in climb and descent.

The data derived from the indicator of the present invention involves certain mathematical analyses to be set forth hereinafter. The symbols used in these analyses are defined herein as follows:

GLOSSARY OF NOMENCLATURE AND SYMBOLS

$Ad$   Drag adjustment. Correction for deviation from standard drag.
$Ar$   Fuel reserve.
$Av$   On-course component of wind. Positive, if a tail wind.
$Aw$   Weight adjustment. Correction for deviation from standard weight.
$\overline{Aw}$   Average weight. $Aw$ corrected for fuel consumed during flight.
$Ca$   Optimum altitude. $Ca$ is computed for either maximum range or maximum endurance, or it can be set manually.
$Ca'$   Offset value of $Ca$ that serves to compensate for the effects of non-standard weight and drag.

$$Ca' = Ca + \Delta Ca$$

$\Delta Ca$   Change in altitude equivalent to variation in weight and drag. $Ca = \Delta Cad + \Delta Caw$.
$\Delta Cad$   Change in altitude equivalent to variation from standard drag.
$\Delta Caw$   Change in altitude equivalent to variation from standard weight.
$Ce$   Obtainable endurance. Computed time in flight for either maximum range or maximum endurance, or for manually set values of $Ca$ and/or $Cv$.
$Ce(cl)$   Time in flight during programmed flight from sea level to altitude $Ca$.
$Ce(cr)$   Time in flight at altitude $Ca$.
$Ce(de)$   Time in flight during programmed descent from altitude $Ca$ to sea level.
$Ce(cl)Ia$   Correction to $Ce(cl)$ for existing altitude of aircraft.
$Cr$   Obtainable range. $Cr$ is computed for either maximum range or maximum endurance, or for manually set values of $Ca$ and/or $Cv$.
$Cr(cl)$   Computed range during programmed climb from sea level to altitude $Ca$.
$Cr(cr)$   Computed range at altitude $Ca$.
$Cr(de)$   Computed range during programmed descent from altitude $Ca$ to sea level.
$Cr(cl)Ia$   Correction to $Cr(cl)$ for existing altitude of aircraft.
$Cv$   Optimum airspeed. $Cv$ is computed for either maximum range or maximum endurance, or it can be set manually.

$Cve$ Computed airspeed for maximum endurance.

$$Cve = f3(Ca, Av)$$

$Cvr$ Computed airspeed for maximum range.

$$Cvr = f1(Ca, Av)$$

$f1, f2$, etc. Functions of variables.
$Ia$ Existing altitude.
$Ie$ Endurance for existing flight condition.

$$Ie = \frac{Qtot - Ar}{\dot{Q}}$$

$Ir$ Range for existing flight condition. $Ir = (Iv + Av)Ie$.
$Iv$ Existing true airspeed.
$Q(cl)$ Weight of fuel consumed in climb from sea level to altitude $Ca$.
$Q(cr)$ Weight of fuel consumed during flight at altitude $Ca$.
$Q(de)$ Weight of fuel consumed in descent from altitude $Ca$ to sea level.
$Qtot$ Total weight of fuel in tanks, as measured by fuel gage.
$Q(cl)Ia$ Correction to $Q(cl)$ for existing altitude of aircraft.
$\dot{Q}$ Rate of flow of fuel, as measured by flow-meter.
$\dot{Q}(cr)$ Rate of flow of fuel at altitude $Ca$.
$\dot{Q}(cr)e$ Rate of flow of fuel for maximum endurance condition.
$\dot{Q}(cr)r$ Rate of flow of fuel for maximum range condition.

*Measured inputs*

The indicator of the present invention requires certain measured inputs. These measured inputs are
 (1) The existing altitude $(Ia)$
 (2) The existing true airspeed $(Iv)$
 (3) The rate of fuel flow $(\dot{Q})$
 (4) The fuel quantity $(Qtot)$

*Manual inputs*

The indicator of the present invention also requires certain manual inputs. These manual inputs are
 (1) Correction $(Ad)$ for deviation from standard drag
 (2) Correction $(Aw)$ for deviation from standard weight
 (3) On-course component $(Av)$ of wind
 (4) Fuel reserve at the end of flight $(Ar)$ selected in accordance with the nature of operational mission, for example, for training, ferrying or combat.

*Existing flight computations*

From the inputs described, the indicator of the present invention makes certain existing flight computations, namely the endurance $(Ie)$ and the range $(Ir)$. The existing endurance $(Ie)$, i.e. the maximum flight time at the existing flight conditions is equal to the fuel available divided by the rate of fuel being consumed. Therefore, from the measured values of the fuel quantity $(Qtot)$ and fuel flow $\dot{Q}$ and the set value of fuel reserve $(Ar)$, the existing endurance $(Ie)$ is computed according to the formula $$Ie = \frac{Qtot - Ar}{\dot{Q}}$$

The existing range $(Ir)$ is equal to the product of the ground speed (equal to the sum of the existing true airspeed $(Iv)$ and the on-course component $(Av)$ of wind) and flight time or endurance $(Ie)$, or $$Ir = (Iv + Av)Ie$$

Here, the on-course component of wind $(Av)$ is assumed to be positive if it is a tail wind.

It is recognized that the preceding formula for computation of $Ir$ is an approximation since $Iv$ is measured in the direction of the aircraft heading rather than along the ground track. However, this approximation is indicated in the specifications of the Department of the Navy, Bureau of Aeronautics to be acceptable. However, $Iv$ could be corrected for drift angle to compute $Ir$ more accurately, if required.

*Optimum flight computations*

The indicator of the present invention also makes certain optimum flight computations from some of the inputs described. Computation of the obtainable range $(Cr)$, the obtainable endurance $(Ce)$, the optimum altitude $(Ca)$, and the optimum airspeed $(Cv)$ is made alternatively for the maximum range condition, for the maximum endurance condition, or for manually selected values of altitude and/or airspeed. A control selector switch permits the pilot to select the condition for which computations are made, as will be described more fully hereinafter.

*Mathematical analyses*

The following general relationships exist

RANGE $$Cr = Cr(cl) - Cr(cl)Ia + Cr(cr) + Cr(de) + Ce \cdot Av \quad (1)$$

ENDURANCE $$Ce = Ce(cl) - Ce(cl)Ia + Ce(cr) + Ce(de) \quad (2)$$

FUEL QUANTITY $$Q(cr) = Qtot - Ar - Q(cl) + Q(cl)Ia - Q(de) \quad (3)$$

*Condition for maximum range*

In accordance with the present invention, the condition for maximum range is determined as follows:
For each value of $Cv$, $Cr$ is a maximum if:

$$\frac{dCr}{dCa} = 0 \quad (4)$$

Differentiating Equation 1 with respect to $Ca$, $$\frac{dCr}{dCa} = \frac{dCr(cl)}{dCa} - \frac{dCr(cl)Ia}{dCa} + \frac{dCr(cr)}{dCa} + \frac{dCr(de)}{dCa} + \frac{dCe \cdot Av}{dCa} \quad (5)$$

In Equation 5:

$$\frac{dCr(cl)Ia}{dCa} = 0 \quad (6)$$

since $Cr(cl)Ia$ is a constant. Also, in Equation 5:

$$\frac{dCr(cr)}{dCa} = \frac{d}{dCa}[Cv \cdot Ce(cr)] = \frac{d}{dCa}\left[\frac{Cv \cdot Q(cr)}{\dot{Q}(cr)}\right]$$

$$= \frac{Q(cr)}{\dot{Q}(cr)} \cdot \frac{dCv}{dCa} + \frac{Cv}{\dot{Q}(cr)} \cdot \frac{dQ(cr)}{dCa} - \frac{Cv \cdot Q(cr)}{\dot{Q}^2(cr)} \cdot \frac{d\dot{Q}(cr)}{dCa} \quad (7)$$

The derivative $$\frac{dQ(cr)}{dCa}$$

in Equation 7 can be expanded by differentiating Equation 3 with respect to $Ca$, thus:

$$\frac{dQ(cr)}{dCa} = \frac{d}{dCa}[Qtot - Ar - Q(cl) + Q(cl)Ia - Q(de)]$$

$$= -\frac{d}{dCa}[Q(cl) + Q(de)] \quad (8)$$

Substituting the above expression in Equation 7;

$$\frac{dCr(cr)}{dCa} = \frac{Q(cr)}{\dot{Q}(cr)} \cdot \frac{dCv}{dCa} - \frac{Cv}{\dot{Q}(cr)} \cdot \frac{d}{dCa}[Q(cl) + Q(de)]$$

$$- \frac{Cv \cdot Q(cr)}{\dot{Q}^2(cr)} \cdot \frac{d\dot{Q}(cr)}{dCa} \quad (9)$$

Again, in Equation 5:

$$\frac{dCe \cdot Av}{dCa} = Ce\frac{dAv}{dCa} + Av\frac{dCe}{dCa} = Av\frac{dCe}{dCa} \quad (10)$$

From Equation 2, $$Av\frac{dCe}{dCa} = Av\frac{d}{dCa}[Ce(cl) - Ce(cl)Ia + Ce(cr) + Ce(de)]$$

$$= Av\frac{d}{dCa}[Ce(cl) + Ce(de)] + Av\frac{d[Q(cr)/\dot{Q}(cr)]}{dCa}$$

$$= Av\frac{d}{dCa}[Ce(cl) + Ce(de)] + \frac{Av}{\dot{Q}(cr)} \cdot \frac{dQ(cr)}{dCa}$$

$$- \frac{Av \cdot Q(cr)}{\dot{Q}^2(cr)} \cdot \frac{d\dot{Q}(cr)}{dCa} \quad (11)$$

Substituting in Equation 11 the expression for $$\frac{dQ(cr)}{dCa}$$

given by Equation 8 and substituting the derivative $$\frac{dCe \cdot Av}{dCa}$$

for $$Av\frac{dCe}{dCa}$$

$$\frac{dCe \cdot Av}{dCa} = Av\frac{d}{dCa}[Ce(cl) + Ce(de)] - \frac{Av}{\dot{Q}(cr)} \frac{d}{dCa}[Q(cl) + Q(de)] - \frac{Q(cr)}{\dot{Q}(cr)} \cdot \frac{Av}{\dot{Q}(cr)} \cdot \frac{d\dot{Q}(cr)}{dCa} \quad (12)$$

Expressions have been derived for the various derivatives appearing in the right-hand member of Equation 5. See Equations 6, 9, and 12. Substituting these expressions in Equation 5 and collecting terms, $$\frac{dCr}{dCa} = \frac{d}{dCa}[Cr(cl) + Cr(de)]$$

$$- \frac{(Cv+Av)}{\dot{Q}(cr)} \cdot \frac{d}{dCa}[Q(cl) + Q(de)] + Av\frac{d}{dCa}[Ce(cl) + Ce(de)]$$

$$- \frac{Q(cr)}{\dot{Q}(cr)}\left[\frac{Cv+Av}{\dot{Q}(cr)} \cdot \frac{d\dot{Q}(cr)}{dCa} - \frac{dCv}{dCa}\right] \quad (13)$$

For maximum range:

$$\frac{dCr}{dCa} = 0$$

$$Cv = Cvr$$

$$\dot{Q}(cr) = \dot{Q}(cr)r$$

Substituting these relations in Equation 13, $$\frac{d}{dCa}[Cr(cl) + Cr(de)] - \frac{Cvr+Av}{\dot{Q}(cr)r} \frac{d}{dCa}[Q(cl) + Q(de)]$$

$$+ Av\frac{d}{dCa}[Ce(cl) + Ce(de)]$$

$$= Ce(cr)\left[\frac{Cvr+Av}{\dot{Q}(cr)r} \cdot \frac{d\dot{Q}(cr)r}{dCa} - \frac{dCvr}{dCa}\right] \quad (14)$$

Equation 14 expresses the condition that $Ca$ must fulfill to produce maximum range. The right-hand member, except for the coefficient $Ce(cr)$, is a function of $Ca$ and $Av$ only, if weight and drag variations are neglected. Likewise, the left-hand member is another function of $Ca$ and $Av$ only. Since no data is considered on the variation of $Cr(cl)$, $Cr(de)$, $Ce(cl)$, $Ce(de)$, $Q(cl)$, and $Q(de)$ with variations from standard weight and drag, Equation 14 must be considered approximate.

*Condition for maximum endurance*

In accordance with the present invention, the condition for maximum endurance is determined as follows:

For each value of $Cv$, $Ce$ is a maximum if:

$$\frac{dCe}{dCa} = 0 \quad (15)$$

The expression for $$\frac{dCe}{dCa}$$

was previously derived and is expressed by Equation 11. Dividing both sides of Equation 11 by $Av$, and substituting $Ce(cr)$ for $Q(cr)/\dot{Q}(cr)$, $$\frac{dCe}{dCa} = \frac{d}{dCa}[Ce(cl) + Ce(de)]$$

$$- \frac{1}{\dot{Q}(cr)} \cdot \frac{d}{dCa}[Q(cl) + Q(de)] - \frac{Ce(cr)}{\dot{Q}(cr)} \cdot \frac{d\dot{Q}(cr)}{dCa} \quad (16)$$

When $Ce$ is a maximum, $$\frac{dCe}{dCa} = 0$$

$$Cv = Cve$$

$$\dot{Q}(cr) = \dot{Q}(cr)e$$

Substituting these relations in Equation 16, $$\frac{d}{dCa}[Ce(cl) + Ce(de)]$$

$$- \frac{1}{\dot{Q}(cr)e} \cdot \frac{d}{dCa}[Q(cl) + Q(de)]$$

$$= \frac{Ce(cr)}{\dot{Q}(cr)e} \cdot \frac{d\dot{Q}(cr)e}{dCa} \quad (17)$$

Equation 17 expresses the condition that $Ca$ must fulfill to produce maximum endurance.

DATA FLOW

Referring to FIG. 1, there is shown the data flow for the indicator of the present invention. This indicator comprises generally a computer 10 and an indicator and control unit 11, including the pilot's instrument panel. The data flow sheet FIG. 1 also shows four measuring instruments for feeding measured inputs to the computer 10, namely an altimeter 12 for the existing altitude ($Ia$), an airspeed indicator 13 for the existing true airspeed ($Iv$), a flowmeter 14 for the rate of flow $\dot{Q}$ and a fuel gage 15 for the total weight of fuel in the tanks ($Qtot$). The measured inputs $Ia$ and $Iv$ are also fed to the indicator and control unit 11 for indication on the panel board, in a manner to be described.

The indicator and control unit 11 FIGS. 1 and 2 has adjustment knobs 16, 17, 18 and 19 for the manual inputs, namely correction ($Ad$) for deviation from standard drag, correction ($Aw$) for deviation from standard weight, on-course component ($Av$) of wind and fuel reserve ($Ar$) selected in accordance with the nature of the operational mission.

As a result of all of these measured and manual inputs fed into the computer 10, the computer estimates the optimum altitude ($Ca$), the optimum airspeed ($Cv$), the obtainable range ($Cr$) and the obtainable endurance ($Ce$).

The indicator and control unit 11 has means by which the different quantities computed and some of the measured quantities are visibly indicated on the panel's panelboard. For that purpose, the four optimum quantities $Ca$, $Cv$, $Cr$ and $Ce$ computed in the computer 10 are delivered to the indicator and control unit 11 and made to operate four counters 21, 22, 23 and 24 respectively on the panel board of said unit for visible indications to the pilot. Similarly, the quantities Ia and Iv from the altimeter 12 and airspeed indicator 13 and the existing range (Ir) and endurance (Ie) obtained from the computer 10 are made to operate four counters 26, 27, 28 and 29 respectively on the panel board of the indicator and control 11 for visible indications to the pilot.

DESCRIPTION OF MECHANISM

FIG. 3 shows diagrammatically the mechanism of the computer unit 10 and FIG. 4 shows diagrammatically the mechanism of the indicator and control unit 11, the transmission lines between the two units being indicated in the two figures by corresponding numbers from 41 to 62, so that the flow from one unit to the other can be more easily traced. In these diagrams of FIGS. 3 and 4, the solid lines represent electrical flow, the value of the quantity depending on voltage, and the dotted lines represent mechanical transmission lines, such as shafts.

The mechanism of the present invention is made up of components, which per se are well-known and which require no description except that set forth herein. The electrical computing components comprise servo and computing amplifiers, resistance-type summing networks, linear and non-linear potentiometers, servo motors, control transformers, synchro-type transmitters (generators) and switches. Mechanical components comprise cams, knobs, counters, gearing and a dial. Computed quantities are represented either by angular positions of rotating parts or by the magnitude and phase of voltages preferably of about 400 cycles per second derived from a balanced reference source. For maximum computing accuracy, the outputs of potentiometers and resistance networks are isolated by amplifiers from electrical loads. Resistance networks have so high an input impedance that their loading effect on potentiometers is negligible.

The different parts of the system operate as follows:

Existing altitude (Ia)

A pressure sensing element (aneroid cell) in altimeter 12 (FIG. 4) drives a miniature low-torque control transformer. This transformer is connected electrically within a servo loop consisting of a servo amplifier 70, a servo motor 71 and a miniature transmitting generator 72 serving as a synchro transmitter. The servo-mechanism thus formed repeats the existing altitude (Ia), the value of which is indicated on the counter 26.

Only the counter 26, the motor 71 and the generator 72 are mounted within the indicator and control unit 11. Amplifier 70 and resistance networks (not shown) may be mounted elsewhere.

Existing true airspeed (Iv)

The existing airspeed (Iv) is measured by the airspeed indicator 13 and is conveyed by a control transformer amplifier 73, motor 74 and generator 75 in the manner described in connection with the existing altitude. The counter 27 on the indicator and control unit 11 indicates the existing true airspeed (Iv).

Fuel flow ($\dot{Q}$)

The flow meter 14 drives either a low-torque potentiometer 76 or generator (not shown) which transmits the rate of flow ($\dot{Q}$) of the fuel being supplied to the aircraft engine. Isolating line amplifier 77 receives and repeats ($\dot{Q}$) for transmission and utilization in the manner to be described.

Fuel quantity (Qtot)

The fuel gage 15 operates a potentiometer 78 that transmits a quantity corresponding to the total quantity (Qtot) of fuel. If the fuel gage output is a non-linear function of fuel quantity, a potentiometer having a matching non-linear characteristic is employed. The quantity (Qtot) is utilized in a manner to be described.

Manual inputs

The knobs 16, 17, 18 and 19 which are manually set for drag adjustment (Ad), weight adjustment (Aw), on-course component (Av) of wind and fuel reserve (Ar) respectively operate respective counters 80, 81, 82 and 83 on the panel for visual indications. The input quantities so set are transmitted by potentiometers 84, 85, 86 and 87 respectively to the computer 10. To aid in setting the fuel reserve (Ar) according to the nature of the operational mission, an engraved dial 88 may be provided indicating by suitable markings, the standard fuel reserve required for such missions as training, ferrying and combat.

Existing endurance (Ie)

The maximum flight time at the existing flight conditions is equal to the fuel available divided by the rate of fuel being consumed, as previously described. From the measured values of the fuel quantity (Qtot) and the fuel rate ($\dot{Q}$), and the set values of fuel reserve (Ar), existing endurance Ie is computed according to the formula:

$$Ie = \frac{Qtot - Ar}{\dot{Q}}$$

The above formula indicates that Ie is correct if $Ie\dot{Q}$ equals $Qtot-Ar$. The quantity Ie is produced by effecting a balance between $Ie\dot{Q}$ and $Qtot-Ar$. For that purpose, the quantities Ar and Qtot obtained in the manner described are delivered to a resistance network 90, as well as the quantity $Ie\dot{Q}$ obtained in a manner to be described. In this resistance network 90, $Ie\dot{Q}$ is compared with $Qtot-Ar$, the result being theoretically zero according to the above equation. Any difference or error signal is amplified by servo amplifier 91 and used to control servo motor 92. The motor 92 drives a potentiometer 93 which received input $\dot{Q}$ from the amplifier 77 as previously described and which multiplies $\dot{Q}$ by Ie. In adjusting Ie to reduce the difference between $Ie\dot{Q}$ and $Qtot-Ar$ to zero, the servo loop computes Ie. The counter 29 on the pilots' instrument panel indicates Ie.

Existing range (Ir)

The existing range (Ir) is equal to the product of ground speed $(Iv+Av)$ and flight time Ie, or $$Ir = (Iv+Av)Ie$$

Here, Av, the on-course component of wind, is assumed to be positive if it is a tail wind.

A zero-balancing servo loop, similar to that for Ie, computes Ir. For that purpose, a differential 95 adds Av and Iv. A potentiometer 96 multiplies $Iv+Av$ by Ie. A resistance network 97 compares the value of Ir with computed $(Iv+Av)Ie$. Their difference, through amplifier 98, controls motor 100a to null or zero the difference, thus computing Ir. The counter 28 indicates Ir.

The motor 100a also drives a potentiometer 99 to convert the quantity Ir into a corresponding electrical quantity for input into the resistance network 97. Similarly, the quantity Ie from the motor 92 is converted by a potentiometer 99a into a corresponding electrical quantity and after being amplified by an amplifier 99b, this quantity Ie is delivered to the potentiometer 96.

Optimum altitude (Ca)

As was shown in the foregoing mathematical analysis, the following differential Equation 14 involving Ca gives the condition which must be satisfied when the computed range is a maximum:

$$\frac{d}{dCa}[Cr(cl)+Cr(de)] - \frac{Cvr+Av}{\dot{Q}(cr)r}\frac{d}{dCa}[Q(cl)+Q(de)]$$

$$+Av\frac{d}{dCa}[Ce(cl)+Ce(de)]$$

$$=Ce(cr)\left[\frac{Cvr+Av}{\dot{Q}(cr)r}\cdot\frac{d\dot{Q}(cr)r}{dCa}-\frac{dCvr}{dCa}\right] \quad (14)$$

This equation is solved for Ca by a computing servo loop which adjusts Ca, so that the right- and left-hand members of the equation balance.

To compute the left-hand member of Equation 14, in the computer 10 (FIG. 3) a barrel-shaped or three-dimensional cam 100 is rotated by Av and its follower is translated axially over the cam surface by Ca. Av is transmitted from the potentiometer 86 (FIG. 4) to a servo mechanism composed of components 101 to 104. The servo output Av in mechanical form goes to the cam 100. Ca is supplied to the cam follower by a servo motor 105, as explained later. From these two inputs Av and Ca, the cam 100 produces an angular movement of the follower that is proportional to the left-hand member of Equation 14. Potentiometer 106 converts the mechanical cam output into a proportional voltage.

As was indicated in the mathematical analysis herein leading to the derivation of Equation 14, it was pointed out that the left-hand member of Equation 14 is a function solely of Ca and Av. The quantities Cr(cl), Cr(de), Q(cl), Q(de), Ce(cl) and Ce(de) have definite relations to the quantities Ca and Av, these relations being derived from the known performance data of the aircraft and being built into the cam 100, so that the inputs Ca and Av into said cam result in an output quantity corresponding to the left-hand members of Equation 14.

The computations described above in connection with Equation 14 neglect the effects of non-standard weight and non-standard drag on the quantities Cr(cl), Cr(de), Q(cl), Q(de), Ce(cl) and Ce(de) as indicated in the mathematical analysis herein. Changes in weight generally have the greatest effect at low speeds and drag at high speeds and their effect on these quantities may be neglected if not excessive. However, suitable corrections may be provided in any case, if desired, to compensate for these deviations.

The right-hand member of Equation 14, except for the coefficient Ce(cr), is a function of Ca and Av only and is computed in a manner similar to that described in connection with the mechanization of the left-hand member of Equation 14. For that purpose, a barrel or three-dimensional cam 107, in response to the inputs Ca and Av, computes the expression on the right-hand member of Equation 14, except for the coefficient Ce(cr), this cam having built into it the known performance data of the aircraft. A potentiometer 108 multiplies the output of the cam 107 by Ce(cr) to produce a quantity corresponding to the full term. The quantity Ce(cr) is supplied by an amplifier 109, as will be described hereinafter more fully.

The network 110 computes the difference between the right- and left-hand members of the different Equation 14. This difference is supplied as an error signal for control of servo motor 105. For that purpose, after amplification by a servo amplifier 111, the error signal Ca is transmitted to a three-position selector control switch 112 and then goes in amplified form to the servo motor 105, which drives the followers of a number of barrel or three-dimensional cams including those of the two cams 100 and 107. The servo motor 105 therefore adjusts Ca so that the error signal is zeroed.

To provide visible indication of the quantity Ca to the pilot at the control and indicator panel, a potentiometer 114 transmits the quantity Ca to a servo mechanism comprising summing network 116 (FIG. 4) servo amplifier 117, servo motor 118, and potentiometer 120. This servomechanism drives counter 21 which indicates Ca to the pilot. Of these components, only motor 118, potentiometer 120 and counter 21 are mounted in the indicator unit. The use of a servomechanism to receive and repeat Ca provides more accurate indication of Ca than could be provided by alternative methods.

Optimum airspeed (Cv)

Representative performance curves for high performance type jet aircraft indicate that at the optimum altitude (Ca), the true airspeed (Cvr) that produces a maximum range is a primary function of Ca and a secondary function of Ad, Aw and Av. A barrel or three dimensional cam 122 driven through the quantity Ca' and having the follower input Av computes Cvr as a function of Av and Ca', where Ca' obtained in a manner to be described, differs from Ca by an amount (Δ Ca) that compensates Cvr for non-standard weight and drag. A potentiometer 123 transmits Cvr through switch 112 to an adding network 124. At network 124, the computed value of Cvr is compared with the servo output of Cv supplied through a potentiometer 125. The difference in voltage, increased by an amplifier 126 and transmitted through the switch 112, controls a servo motor 127 to make Cv equal to Cvr. Components 128, 130, 131 and 132 of a servo mechanism provide indication of Cv at the data indicator and control panel for indication on the counter 22. Only motor 130 and potentiometer 132 of these components are mounted in the indicator unit.

Obtainable range (Cr)

The obtainable range (Cr) is equal to the sum of the distance travelled Cr(cl) during the programmed climb, the distance travelled, Cr(cr) at optimum altitude and airspeed, and the distance travelled Cr(de) during the programmed descent with allowance for the range effect Cr(cl)Ia represented by the present altitude (Ia) of the aircraft and the range effect, Ce·Av due to the on-course component of wind. Expressed mathematically:

$$Cr = Cr(cl) + Cr(cr) + Cr(de) - Cr(cl)Ia + Ce \cdot Av \quad (1)$$

To mechanize Equation 1, a potentiometer 135 computes Cr(cl)+Cr(de) as a function of Ca, this potentiometer having a non-linear characteristic following the representative performance curve of the aircraft determining the relationship between Ca and Cr(cl)+Cr(de). A potentiometer 136 multiplies Cv by the time in flight Ce(cr) at altitude Ca. This product Cv·Ce(cr) equals equals Cr(cr). A non-linear potentiometer 137 with the built-in performance characteristic Cr(cl) in relation to Ia computes Cr(cl)Ia as a funtion of Ia. Thus, there is available all components of Cr, except Ce·Av. These are supplied as inputs to an adding network 138.

A potentiometer 140 computes Ce[Av+Av(max)], where Av(max) is the maximum value of Av. A direct connection from an adding network 141 supplies $$-Ce \cdot Av(\text{max})$$

to network 138, thereby cancelling the +Ce·Av(max) term included in the output of potentiometer 140 and producing Ce·Av within network 138. An amplifier 142 prevents the relatively low impedance load of potentiometer 140 from affecting the computing accuracy of potentiometer 143 to be described.

The purpose of computing Ce·Av in the above-described manner is to simplify the instrumentation. Since Ce·Av can be either positive or negative depending on the sign of Av, Ce·Av must be represented by a voltage whose phase changes in agreement with the change in sign of Ce·Av. For simplicity, however, amplifier 142 and potentionmeter 140 operate in a single phase circuit, and the required change in phase is produced by combining the potentiometer output with a voltage of opposite phase from the network 141. This eliminates the need for an additional or more complex amplifier.

In the network 138, the output of a potentiometer 144, representing the servo response $Cr$, is compared with the value of $Cr$ computed in accordance with Equation 1. The network 138 thereby originates an error signal which, after amplification by a servo amplifier 145, controls a servo motor 146. The counter 23 indicates the computed valve of $Cr$.

Obtainable endurance ($Ce$)

The obtainable endurance ($Ce$) is equal to the sum of the flight time $Ce(cl)$ during the programmed climb, the flight time $Ce(cr)$ at optimum airspeed and altitude, and the flight time $Ce(de)$ during the programmed descent with allowance for the reduction $Ce(cl)Ia$ in $Ce(cl)$ due to the existing altitude ($Ia$). Expressed mathematically, $$Ce = Ce(cl) + Ce(cr) + Ce(de) - Ce(cl)Ia \quad (2)$$

A non-linear potentiometer 152 computes $Ce(cl) + Ce(de)$ as a function of $Ca$ in agreement with the representative performance curve of the aircraft. $Ce(cr)$ is obtained from the amplifier 109 in the manner to be described. A non-linear potentiometer 153 with the built-in performance characteristic of the aircraft computes $Ce(cl)Ia$ as a function of $Ia$. The network 141 computes $Ce$ from these factors and compares it with $Ce$ from the potentiometer 143 to form a servo error signal for an amplifier 154 and a motor 155. The quantity $Ce$ thus computed is indicated on counter 24 on the pilot's indicator board.

Computation of $Ce(cr)$

Necessary for the computation of $Ce$ is the value of $Ce(cr)$. By equating fuel quantities, it may be shown that $$Q(cr) = Qtot - Q(cl) - Q(de) + Q(cl)Ia - Ar \quad (3)$$

but $$Q(cr) = Ce(cr) \cdot \dot{Q}(cr)r \quad (3a)$$

hence $$Ce(cr) \cdot \dot{Q}(cr)r = Qtot - Q(cl) - Q(de) + Q(cl)Ia - Ar \quad (3b)$$

Computation of $Ce(cr)$ is made by an electrical feedback loop which balances the right-and left-hand members of the above equation. The various terms of this equation are derived as follows:

$Q(cl) + Q(de)$ is computed by a non-linear potentiometer 155 as a function of $Ca$ in accordance with the representative performance curve of the aircraft. $Qtot$ is measured by the gage 15. $Q(cl)Ia$ is supplied by a non-linear potentiometer 156 with the performance characteristics of the aircraft built into it. $Ar$ is set by the knob 19 on the indicator panel and is transmitted by the potentiometer 87. $\dot{Q}(cr)r$ computed as will be explained, is supplied to a potentiometer 157.

In potentiometer 157, $\dot{Q}(cr)r$ is multiplied by $Ce(cr)$ forming $Q(cr)$ according to Equation 3a. A network 158 compares $Q(cr)$ with the terms in the right-hand member of Equation 3 or 3b, to obtain an input signal for the amplifier 109. The amplifier output by virtue of negative feedback and high amplifier gain, assumes the value $Ce(cr)$.

Computation of $\dot{Q}(cr)$ and $\dot{Q}(cr)r$

Representative performance curves of the aircraft indicate that $\dot{Q}(cr)$ is a function of $Ca$, $Cv$ and $Aw$. It is also a function of $Ad$. Therefore, a barrel or three-dimentional cam 160 computes $\dot{Q}(cr)$ as a function of $Ca'$ and $Cv$, $Ca'$ being an offset value of $Ca$ which compensates for the effects of non-standard weight and drag. The cam output goes to the potentiometer 157.

The maximum range value of $\dot{Q}(cr)$ is $\dot{Q}(cr)r$. $\dot{Q}(cr)r$ is computed by cam 160 when the cam inputs of $Cv$ and $Ca'$ are the values that correspond to the maximum range condition, as they are in the present case.

Computation of $Ca'$

Necessary for computation of $Q(cr)$ and also other quantities, is the compensated value $Ca'$ where $$Ca' = Ca + \Delta Ca$$

The basis for computation of $Ca'$ is as follows: A series of representative performance curves of an aircraft may be drawn, for example, with fuel flow $\dot{Q}$ as ordinate and optimum airspeed $Cv$ as abscissa for different altitudes $Ca$ and different weights. Such a series of curves indicates, that a change in weight is equivalent approximately to a change in altitude of the aircraft. For example, a curve for an aircraft weight of 12,000 pounds and an altitude of 5000 feet could be roughly approximated if a curve were drawn for an aircraft weight of 13,000 pounds and an altitude of 6000 feet. Hence, a change in weight from 13,000 pounds to 12,000 pounds could be approximated by a change in altitude from 5,000 feet to 6,000 feet, as far as the computation for $\dot{Q}(cr)$ is concerned. However, this indicated change in altitude is not exactly equivalent to the indicated change in weight because the curves for different weights are not parallel. To make the computations exact, the computed relation between a change in weight and the equivalent change in altitude is made to vary with $Ca$ and $Cv$.

The instrumentation for computation of $Ca'$ is as follows: A barrel or three-dimensional cam 162 computes the relation between a unit change in weight and the equivalent change in altitude as a function of $Ca$ and $Cv$, in accordance with the known performance characteristics of the aircraft. A potentiometer 163 multiplies the effect of a unit change in weight by the total deviation $\overline{Aw}$ from standard weight to compute the total effect ($\Delta Caw$). Here, computed $\overline{Aw}$ differs from the set value $Aw$ by the average reduction in weight due to fuel consumed during flight at altitude $Ca$. The average weight of fuel during flight at altitude $Ca$ is:

$$Qtot - Q(cl) + Q(cl)Ia - \frac{Q(cr)}{2}$$

Presumably, the preset value of $Aw$ is based upon the weight of fuel in the tanks prior to take-off. Therefore, the loss of weight not included in $Aw$ is:

$$Q(cl) - Q(cl)Ia + \frac{Q(cr)}{2}$$

A network 164 computes $\overline{Aw}$ as follows:

$$\overline{Aw} = Aw - Q(cl) - Q(de) + Q(cl)Ia - \frac{Q(cr)}{2}$$

Inclusion of $Q(de)$ in this computation is believed to have little material effect since $\overline{Aw}$ is involved in a second order correction $\Delta Caw$. Isolating amplifier 165 repeats $Aw$ and supplies it to potentiometer 163 for computation of $\Delta Caw$.

Similarly, a three-dimensional or barrel cam 166 and a potentiometer 167 compute the equivalent change $\Delta Cad$ in altitude due to a variation from standard drag. The effect of the electrical loading of potentiometer 167 on the potentiometer 84 is small and may be neglected, since $Ad$ is involved in a second order correction $\Delta Cad$.

A network 168 adds the individual altitude corrections for weight and drag to form the total altitude correction $\Delta Ca$. This network 168 also adds $\Delta Ca$ to $Ca$, thus computing $Ca'$. The servo response of $Ca'$ coming from a potentiometer 170 is compared with computer $Ca'$ in the network 168. Their difference forms an error signal that controls a servo motor 171 by way of an amplifier 172. $Ca'$ from servo motor 171 is supplied to the cams 122 and 160 and to non-linear potentiometers 174 and 175.

Maximum endurance computations

Through suitable changes in circuitry effected by the setting switch 112 at Maximum Endurance, $Ca$, $Cv$, $Cr$ and $Ce$ are computed for the maximum endurance condition in place of the maximum range condition. For that purpose the following changes are made:

*$Cve$ for $Cvr$.*—Non-linear potentiometer 174 replaces the barrel cam 122 and the potentiometer 123. Since $Cve$ is independent of $Av$, a single potentiometer can compute $Cve$.

*Change in $Ca$ computation.*—For maximum endurance, the following differential equation derived in the Mathematical Analysis is solved for $Ca$:

$$\frac{d}{dCa}[Ce(cl) + Ce(de)]$$

$$-\frac{1}{Q(cr)e} \cdot \frac{d}{dCa}[Q(cl) + Q(de)]$$

$$= \frac{Ce(cr)}{\dot{Q}(cr)e} \cdot \frac{d\dot{Q}(cr)e}{dCa}$$

(17)

The left-hand member of Equation 17 is computed by a non-linear potentiometer 176, the right-hand member by a potentiometer 175. Their comparison in a network 177 originates an error signal, which is amplified in an amplifier 180 and transmitted through the switch 112 to the servo motor 105. The motor 105 drives the potentiometer 175 and 176 to produce a balance between the sides of the equation.

Manual control computations

If the switch 112 is set at Manual, $Cr$ and $Ce$ are computed automatically for selected values of $Ca$ and $Cv$. Circuitry and functional operation are outlined below.

Switching

Switch 112 establishes the following connections when at Manual:

(a) The motors 105 and 127 are connected to switches 185 and 186 respectively on the pilot's panel board. These switches 185 and 186 are centered by springs. Turning them right or left causes motors 105 and 127 to drive the $Ca$ and $Cv$ lines in an increasing or decreasing direction. Thus $Ca$ and $Cv$ can be set at any selected value or they can be slewed from one limit to the other.

(b) Servo amplifiers 111, 126 and 180 are connected to protective loading resistors 187, 188 and 189.

(c) The input to network 124 is grounded for protection.

Computations

In Manual Control, cams 100, 107 and 122, potentiometers 106, 108, 174, 174 and 176 and the associated circuitry for computation of $Ca$ and $Cv$ are not used. Instead, $Ca$ and $Cv$ are set manually by the switches 185 and 186 and the set values are indicated on counters 21 and 22. These set values of $Ca$ and $Cv$ are supplied as inputs to the remainder of the computing system, which solves for the obtainable range ($Cr$) and the obtainable endurance ($Ce$) under the set conditions. Except for the values of $Ca$ and $Cv$, this computation of $Cr$ and $Ce$ is identical with their computation under the maximum range or maximum endurance condition.

OPERATING PROCEDURES

The following description of the various types of operations possible is best understood by reference to FIGS. 1 and 2. Except for the switches 112, 185 and 186, the different operations possible are described herein for the sake of clarity in terms of the symbols relating to their functions.

To obtain continuous indication of altitude ($Ia$), true airspeed ($Iv$), existing range ($Ir$) and existing endurance ($Ce$):

(a) Set $Av$ and $Ar$,
(b) Read $Ia$, $Iv$, $Ir$ and $Ie$ counters.

To obtain continuous indication of optimum altitude ($Ca$), optimum airspeed ($Cv$), obtainable range ($Cr$), obtainable endurance ($Ce$):

(a) Set $Ad$, $Aw$, $Av$ and $Ar$,
(b) Set switch 112 at Maximum Endurance position, or
(c) Set switch 112 at Maximum Range position,
(d) Read $Ca$, $Cv$, $Cr$ and $Ce$.

To determine optimum altitude ($Ca$), optimum airspeed ($Cv$), time of flight ($Ce$) and fuel reserve ($Ar$) at destination to fly a desired course and distance with minimum fuel consumption:

(a) Set switch 112 at Maximum Range position,
(b) Set $Aw$, $Ad$ and $Av$,
(c) Adjust $Ar$ so that $Cr$ counter indicates desired distance,
(d) Read $Ca$, $Cv$, $Ce$ and $Ar$.

To determine time in flight ($Ce$) and fuel reserve ($Ar$) at destination to fly a desired course and distance at a selected altitude and/or airspeed with winds known:

(a) Set switch 112 at Manual position,
(b) Set $Ca$ and/or $Cv$ by means of switches 185 and/or 186,
(c) Set $Aw$, $Ad$ and $Av$.
(d) Set $Ar$ so that $Cr$ counter indicates desired distance,
(e) Read $Ce$ and $Ar$.

To determine range and endurance for a selected fuel reserve:

(a) Set $Ad$, $Aw$, $Av$ and $Ar$.
(b) Set switch 112 at Maximum Range and read $Cr$ and $Ce$, or
(b') Set switch 112 at Maximum Endurance and read $Ce$ and $Cr$, or
(b'') Set switch 112 at Manual, set $Ca$ and $Cv$ manually, and read $Ce$ and $Cr$.

To determine the effect of wind on best airspeed for maximum range:

(a) Set $Ad$, $Aw$ and $Ar$,
(b) Set switch 112 at Maximum Range position,
(c) Vary $Av$ and note its effect on $Cv$.

To determine range, endurance and optimum airspeed for flight at a selected altitude:

(a) Set $Ad$, $Aw$, $Av$ and $Ar$,
(b) Set switch 112 at Manual,
(c) Set $Ca$ at selected value by switch 185,
(d) Slew $Cv$ from one limit to the other by switch 186, observing $Cr$ or $Ce$ counter.

Optimum altitude is value of $Cv$ that maximizes $Cr$ (maximum range) or $Ce$ (maximum endurance).

To determine range, endurance and optimum altitude for flight at a selected airspeed:

(a) Set $Ad$, $Aw$, $Av$ and $Ar$,
(b) Set switch 112 at Manual,
(c) Set $Cv$ at selected value by switch 186,
(d) Slew $Ca$ from one limit to the other by switch 185, observing $Cr$ or $Ce$ counter.

Optimum altitude is value of $Ca$ that maximizes $Cr$ (maximum range) or $Ce$ (maximum endurance).

It is possible within the spirit of the present invention to simplify and reduce the instrumentation shown in the accompanying drawings, with corresponding sacrifice in accuracy. One of the aircraft performance data curves employed in connection with the instrumentation of the present invention is an endurance vs. altitude curve for climb and descent of the aircraft and another performance data curve of the aircraft employed is a range vs. altitude curve for climb and descent. If, for every type of aircraft, one of the climb and descent curves described can be made very nearly parallel with the other corresponding climb and descent curve when drawn to a suitable scale, it is possible to eliminate potentiometers 152 and 153. In this case, the quantities that are indicated as being supplied by potentiometers 152 and 153, would be obtained from potentiometers 135 and 137, respectively by introduction of suitable constants.

If for every type of aircraft, the range vs. altitude curves for climb and descent can be approximated with sufficient accuracy by straight lines, potentiometer 155 can be eliminated. In this case, the quantities that are indicated as being supplied by potentiometer 155 would be obtained directly from potentiometer 114 with introduction of the proper constants at networks 158 and 163 for the slopes and intercepts of the straight lines.

Network 177 and servo amplifier 180 functionally parallel network 110 and amplifier 111 as both serve to control motor 105. If the input connections to network 110 can be switched from potentiometers 106 and 108 to potentiometers 175 and 176 by means of switch 112 or by a relay controlled by switch 112, then network 177 and servo amplifier 180 can be eliminated. However, the error signal for servo motor 105 is at a microvolt level at networks 110 and 177 so that cables and switch contacts in the network input circuits may introduce noise voltages which are not far below the error signal voltage.

What is claimed is:

1. An aircraft data indicator operable while in flight, comprising manually settable means for supplying as a physical quantity the fuel reserve $Ar$ desired at destination, means for measuring and supplying as a physical quantity the total amount of fuel $Qtot$ in the aircraft, means for measuring and supplying as a physical quantity the rate of flow of the fuel $Q$, means responsive to the quantities $Ar$, $Qtot$ and $Q$ for obtaining as a physical quantity the endurance $Ie$ of the aircraft for existing conditions, means for measuring and supplying as a physical quantity the existing true speed $Iv$, manually settable means for supplying as a physical quantity the on-course component $Av$ of wind, and means responsive to the quantities $Iv$, $Av$ and $Ie$ for automatically indicating the range $Ir$ for existing flight conditions.

2. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, and means responsive to the quantities $Ar$, $Av$, $Qtot$ and $Ia$ for indicating automatically the optimum altitude $Ca$ for maximum range, assuming that the aircraft followed a programmed ascent from a predetermined level to the altitude $Ca$ and a programmed descent from the altitude $Ca$ to a predetermined level.

3. An aircraft data indicator operable while in flight as described in claim 2, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining optimum altitude $Ca$ for maximum range compensated by said correction quantities $Aw$ and $Ad$.

4. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, and means responsive to the quantities $Ar$, $Av$, $Qtot$ and $Ia$ for indicating automatically the optimum altitude $Ca$ for maximum endurance, assuming that the aircraft followed a programmed ascent from a predetermined level to the altitude $Ca$ and a programmed descent from the altitude $Ca$ to a predetermined level.

5. An aircraft data indicator operable while in flight, as described in claim 4, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining optimum altitude $Ca$ for maximum endurance compensated by said correction quantities $Aw$ and $Ad$.

6. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating automatically the optimum altitude $Ca$ of maximum range, assuming that the aircraft followed a programmed ascent from a predetermined level to the altitude $Ca$ and a programmed descent from the altitude $Ca$ to a predetermined level, means responsive to the quantities $Ar$, $Av$, $Qtot$ and $Ia$ for indicating automatically the optimum altitude $Ca$ for maximum endurance assuming that the aircraft followed a programmed ascent from a predetermined level to the altitude $Ca$ and a programmed descent from the altitude $Ca$ to a predetermined level, and selector means for rendering either one of said indicating means operative and the other indicating means inoperative.

7. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, and means responsive to the quantaties $Ar$, $Av$, $Qtot$ and $Ia$ for indicating automatically the optimum airspeed $Cvr$ for maximum range, assuming that the aircraft followed a programmed ascent from a predetermined level to optimum altitude $Ca$ and a programmed descent from the altitude $Ca$ to a predetermined level.

8. An aircraft data indicator operable while in flight as described in claim 7, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining optimum airspeed $Cvr$ for maximum range compensated by said correction quantities $Aw$ and $Ad$.

9. An aircraft data indicator operable while in flight, comprising manually settable means for supplying as a physical quantity the fuel reserve $Ar$ desired at destination, means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, and means responsive to the quantities $Ar$, $Av$, $Qtot$ and $Ia$ for indicating automatically the optimum airspeed $Cve$ for maximum endurance assuming that the aircraft followed a programmed ascent from a predetermined level to optimum altitude $Ca$ and a programmed descent from the altitude $Ca$ to a predetermined level.

10. An aircraft data indicator operable while in flight as described in claim 9, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining optimum airspeed $Cve$ for maximum endurance compensated by said correction quantities $Aw$ and $Ad$.

11. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating automatically the optimum airspeed $Cvr$ for maximum range, assuming that the aircraft followed a programmed ascent from a predetermined level to optimum altitude $Ca$ and a programmed descent from the altitude $Ca$ to a predetermined level, means responsive to the quantities $Ar$, $Av$, $Qtot$ and $Ia$ for indicating automatically the optimum airspeed $Cve$ for maximum endurance assuming that the aircraft followed a programmed ascent from a predetermined level to optimum altitude $Ca$ and a programmed descent from the altitude $Ca$ to a predetermined level, and selector means for rendering either one of said indicating means operative and the other indicating means inoperative.

12. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, and means responsive to the quantities $Ar$, $Av$, $Qtot$ and $Ia$ for indicating automatically the obtainable range $Cr$ for maximum range, assuming that the aircraft followed a programmed ascent from a predetermined level to optimum altitude $Ca$ and a programmed descent from altitude $Ca$ to a predetermined level.

13. An aircraft data indicator operable while in flight as described in claim 12, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining obtainable range for maximum range compensated by said correction quantities $Aw$ and $Ad$.

14. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, and means responsive to the quantities $Ar$, $Av$, $Qtot$ and $Ia$ for indicating automatically the obtainable range $Cr$ for maximum endurance, assuming that the aircraft followed a programmed ascent from a predetermined level to optimum altitude $Ca$ and a programmed descent from altitude $Ca$ to a predetermined level.

15. An aircraft data indicator operable while in flight as described in claim 14, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining obtainable range for maximum endurance compensated by said correction quantities $Aw$ and $Ad$.

16. An aircraft data indicator operable while in flight as described in claim 9, comprising manually settable means for supplying as a physical quantity correction $Aw$ for deviation from standard weight, manually settable means for supplying as a physical quantity correction $Ad$ for deviation from standard drag, means for applying said corrections $Aw$ and $Ad$ to said indicating means for obtaining optimum airspeed $Cve$ for maximum endurance compensated by said correction quantities $Aw$ and $Ad$, means responsive to the quantities $Ar$, $Av$, $Qtot$ and $Ia$ for indicating automatically the obtainable range $Cr$ for maximum endurance, assuming that the aircraft followed a programmed ascent from a predetermined level to optimum altitude $Ca$ and a programmed descent from altitude $Ca$ to a predetermined level, and selector means for rendering either one of said indicating means operative and the other indicating means inoperative.

17. An aircraft data indicator operable while in flight, comprising manually settable means for supplying as a physical quantity the fuel reserve $Ar$ desired at destination, manually settable means for supplying as a physical quantity the on-course component $Av$ of wind, means, for measuring and supplying as a physical quantity the total amount of fuel $Qtot$ in the aircraft, means for measuring and supplying as a physical quantity the existing altitude $Ia$ of the aircraft, and means responsive to the quantities $Ar$, $Av$, $Qtot$ and $Ia$ for indicating automatically the obtainable endurance $Ce$ for maximum range, assuming that the aircraft followed a programmed ascent from a predetermined level to optimum altitude $Ca$ and a programmed descent from altitude $Ca$ to a predetermined level.

18. An aircraft data indicator operable while in flight as described in claim 17, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining obtainable endurance for maximum range compensated by said correction quantities $Aw$ and $Ad$.

19. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft and means responsive to the quantities $Ar$, $Av$, $Qtot$ and $Ia$ for indicating automatically the obtainable endurance $Ce$ for maximum endurance, assuming that the aircraft followed a programmed ascent from a predetermined level to optimum altitude $Ca$ and a programmed descent from altitude $Ca$ to a predetermined level.

20. An aircraft data indicator operable while in flight as described in claim 19, comprising manually settable means for supplying as a physical quantity correction $Aw$ for deviation from standard weight, manually settable means for supplying as a physical quantity correction $Ad$ for deviation from standard drag, and means for applying said corrections $Aw$ and $Ad$ to said indicating means for obtaining obtainable endurance for maximum endurance compensated by said correction quantities $Aw$ and $Ad$.

21. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating automatically the obtainable endurance $Ce$ for maximum range, means responsive to the quantities $Ar$, $Av$, $Qtot$ and $Ia$ for indicating automatically the obtainable endurance $Ce$ for maximum endurance, and selector means for rendering either one of said indicating means operative and the other indicating means inoperative.

22. An aircraft data indicator operable while in flight, comprising manually settable means for supplying as a physical quantity the fuel reserve $Ar$ which will be on hand at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating automatically the range $Cr$ for minimum fuel consumption, assuming that the aircraft follows a programmed ascent from a predetermined level to an optimum altitude $Ca$ and a programmed descent from the altitude $Ca$ to a predetermined level, the readings on said indicating means corresponding to adjustments in the manually settable means for the quantity $Ar$, whereby the desired range $Cr$ can be adjusted by setting the manually settable means for the quantity $Ar$, until said indicating means indicates the desired range, and means for indicating automatically the optimum altitude $Ca$ for minimum fuel consumption to fly the desired range.

23. An aircraft data indicator operable while in flight, comprising manually settable means for supplying as a physical quantity the fuel reserve $Ar$ which will be on hand at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating automatically the range $Cr$ for minimum fuel consumption, assuming that the aircraft follows a programmed ascent from a predetermined level to an optimum altitude $Ca$ and a programmed descent from the altitude $Ca$ to a predetermined level, the readings on said indicating means corresponding to adjustments in the manually settable means for the quantity $Ar$, whereby the desired range $Cr$ can be adjusted by setting the manually settable means for the quantity $Ar$, until said indicating means indicates the desired range, and means for indicating automatically the optimum airspeed $Cv$ for minimum fuel consumption to fly the desired range.

24. An aircraft data indicator operable while in flight, comprising manually settable means for supplying as a physical quantity the fuel reserve $Ar$ which will be on hand at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating automatically the range $Cr$ for minimum fuel consumption, assuming that the aircraft follows a programmed ascent from a predetermined level to an optimum altitude $Ca$ and a programmed descent from the altitude $Ca$ to a predetermined level, the readings on said indicating means corresponding to adjustments in the manually settable means for the quantity $Ar$, whereby the desired range $Cr$ can be adjusted by setting the manually settable means for the quantity $Ar$, until said indicating means indicates the desired range, and means for indicating automatically the time of flight $Ce$ for minimum fuel consumption to fly the desired range.

25. An aircraft data indicator operable while in flight, comprising manually settable means for supplying as a physical quantity the fuel reserve $Ar$ which will be on hand at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating the range for a selected altitude, assuming that the aircraft follows a programmed ascent from a predetermined level to said selected altitude and a programmed descent from the selected altitude to a predetermined level, the readings on said indicating means corresponding to adjustments in the manually settable means for the quantity $Ar$, whereby the desired range can be adjusted by setting the manually settable means for the quantity $Ar$, until said indicating means indicates the desired range, manually settable selector means for selecting a desired altitude, and means for automatically indicating the time of flight $Ce$ at the selected altitude and at the selected range.

26. An aircraft data indicator operable while in flight, comprising manually settable means for supplying as a physical quantity the fuel reserve $Ar$ which will be on hand at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating the range for a selected airspeed, assuming that the aircraft follows a programmed ascent from a predetermined level and a programmed descent to a predetermined level the readings on said indicating means corresponding to adjustments in the manually settable means for the quantity $Ar$, whereby the desired range can be adjusted by setting the manually settable means for the quantity $Ar$, until said indicating means indicates the desired range, manually settable selector means for selecting the desired airspeed, and means for automatically indicating the time of flight $Ce$ at the selected airspeed and at the selected range.

27. An aircraft data indicator operable while in flight, comprising manually settable means for supplying as a physical quantity the fuel reserve $Ar$ which will be on hand at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for indicating the range selectively for a selected altitude, for a selected airspeed or for a selected altitude and a selected airspeed, assuming that the aircraft follows a programmed ascent from a predetermined level and a programmed descent to a predetermined level, the readings on said indicating means corresponding to adjustments in the manually settable means for the quantity $Ar$, whereby the desired range can be adjusted by setting the manually settable means for the quantity $Ar$, until said indicating means indicates the desired range, manually settable selector means for selecting the desired altitude, manually settable selector means for selecting the desired airspeed, and means for automatically indicating the time of flight $Ce$ at the selected altitude and at the selected range when the altitude is selected, at the selected airspeed and at the selected range when the airspeed is selected, and at the selected altitude, selected airspeed and selected range, when both altitude and airspeed are selected.

28. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, a manual altitude selector, a manual airspeed selector, and means responsive to the quantities $Av$, $Ar$, $Qtot$ and $Ia$ and to the settings of said altitude selector and said airspeed selector for indicating range $Cr$ for maximum range for the selected altitude, assuming that the aircraft follows a programmed ascent from a predetermined level to the selected altitude and a programmed descent from the selected altitude to a predetermined level, said airspeed selector being manipulatable until said range indicating means indicates maximum range, whereby the airspeed so selected is of optimum value for maximum range.

29. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, a manual altitude selector, a manual airspeed selector, and means responsive to the quantities $Av$, $Ar$, $Qtot$ and $Ia$ and to the settings of said altitude selector and said airspeed selector for indicating endurance $Ce$ for the selected altitude for maximum endurance, assuming that the aircraft follows a programmed ascent from a predetermined level to the selected altitude and a programmed descent from the selected altitude to a predetermined level, said airspeed selector being manipulatable until said endurance indicating means indicates maximum endurance, whereby the airspeed so selected is of optimum value for maximum endurance.

30. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, a manual altitude selector, a manual airspeed selector, means responsive to the quantities $Av$, $Ar$, $Qtot$ and $Ia$ and to the settings of said altitude selector and said airspeed selector for indicating range $Cr$ from maximum range for the selected altitude and the selected airspeed, assuming that the aircraft follows a programmed ascent from a predetermined level to the selected altitude and a programmed descent from the selected altitude to a predetermined level, and means responsive to the quantities $Av$, $Ar$, $Qtot$ and $Ia$ and to the settings of said altitude selector and said airspeed selector for indicating endurance $Ce$ for maximum endurance for the selected altitude and the selected airspeed, said airspeed selector being manipulatable to maximize the indication of said range indicator to determine the optimum airspeed for maximum range and being manipulatable to maximize the indication of the endurance indicator to determine the optimum airspeed for maximum endurance, said altitude selector being manipulatable to maximize the indication of said range indicator to determine the maximum altitude for maximum range and being manipulatable to maximize the indication of the endurance indicator to determine the maximum altitude for maximum endurance.

31. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for determining and obtaining as a physical quantity time in flight $Ce(cr)$ at optimum altitude $Ca$ and means responsive to the quantities $Ar$, $Av$, $Qtot$, $Ia$ and $Ce(cr)$ as inputs for mechanizing the equation $$\frac{d}{dCa}[Cr(cl)+Cr(de)]-\frac{Cvr+Av}{\dot{Q}(cr)r}\cdot\frac{d}{dCa}[Q(cl)+Q(de)]$$
$$+Av\frac{d}{dCa}[Ce(cl)+Ce(de)]$$
$$=Ce(cr)\left[\frac{Cvr+Av}{\dot{Q}(cr)r}\cdot\frac{d\dot{Q}}{dCa}(cr)r-\frac{dCvr}{dCa}\right]$$

to obtain $Ca$ for maximum range, in said equation the symbols having the following meanings:

$Cr(cl)$ = computed range during programmed climb from sea level to altitude $Ca$ $Cr(de)$ = computed range during programmed descent from altitude $Ca$ to sea level $Cvr$ = computed airspeed for maximum range $\dot{Q}(cr)r$ = rate of flow of fuel for maximum range condition $Q(cl)$ = weight of fuel consumed in climb from a predetermined level to altitude $Ca$ $Q(de)$ = weight of fuel consumed in descent from altitude $Ca$ to a predetermined level $Ce(cl)$ = time in flight during programmed flight from predetermined level to altitude $Ca$ $Ce(de)$ = time in flight during programmed flight from altitude $Ca$ to a predetermined level the quantities $Cr(cl)$, $Cr(de)$, $Cvr$, $\dot{Q}(cr)r$, $Q(cl)$, $Q(de)$, $Ce(cl)$ and $Ce(de)$ built-into said equation mechanizing means in accordance with the known performance data of the aircraft.

32. An aircraft data indicator operable while in flight, comprising manually settable means for supplying as a physical quantity the fuel reserve $Ar$ desired at destination, manually settable means for supplying as a physical quantity the on-course component $Av$ of wind, means for measuring and supplying as a physical quantity the total amount of fuel $Qtot$ in the aircraft, means for measuring and supplying as a physical quantity the existing altitude $Ia$ of the aircraft, means responsive to the quantities $Ar$, $Av$, $Qtot$ and $Ia$ for determining and obtaining as a physical quantity time in flight $Ce(cr)$ at optimum altitude $Ca$, and means responsive to the quantities $Ar$, $Av$, $Qtot$, $Ia$ and $Ce(cr)$ as inputs for mechanizing the equation $$\frac{d}{dCa}[Ce(cl)+Ce(de)]$$
$$-\frac{1}{\dot{Q}(cr)e}\cdot\frac{d}{dCa}[Q(cl)+Q(de)]$$
$$=\frac{Ce(cr)}{\dot{Q}(cr)e}\cdot\frac{d\dot{Q}(cr)e}{dCa}$$

to obtain $Ca$ for maximum endurance, in said equation the symbols having the following meanings:

$Ce(cl)$ = time in flight during programmed flight from altitude $Ca$ to a predetermined level $Ce(de)$ = time in flight during programmed flight from altitude $Ca$ to a predetermined level $\dot{Q}(cr)e$ = rate of flow of fuel for maximum endurance condition $Q(cl)$ = weight of fuel consumed in climb from a predetermined level to altitude $Ca$ $Q(de)$ = weight of fuel consumed in descent from altitude $Ca$ to a predetermined level

References Cited in the file of this patent

UNITED STATES PATENTS

| | | |
|---|---|---|
| 2,179,531 | Trapnell | Nov. 14, 1939 |
| 2,582,588 | Fennessy et al. | Jan. 15, 1952 |
| 2,656,977 | Cummings | Oct. 27, 1953 |
| 2,807,165 | Kuzyk et al. | Sept. 24, 1957 |